(12) United States Patent
Fukuda et al.

(10) Patent No.: US 8,651,551 B2
(45) Date of Patent: Feb. 18, 2014

(54) WINDSHIELD DEVICE FOR SADDLE-RIDE VEHICLES

(75) Inventors: Satoshi Fukuda, Niiza (JP); Masayuki Taniguchi, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/398,839

(22) Filed: Feb. 17, 2012

(65) Prior Publication Data

US 2012/0248812 A1    Oct. 4, 2012

(30) Foreign Application Priority Data

Mar. 30, 2011   (JP) ................................. 2011-076609

(51) Int. Cl.
    *B62J 17/00*    (2006.01)
(52) U.S. Cl.
    USPC ..................... 296/78.1; 296/96.21; 280/124.1
(58) Field of Classification Search
    USPC ............................ 296/78.1, 96.21; 280/124.1
    See application file for complete search history.

(56) References Cited

U.S. PATENT DOCUMENTS

| | | | | |
|---|---|---|---|---|
| 6,234,554 B1 * | 5/2001 | Willey | ......................... | 296/78.1 |
| 6,736,441 B1 | 5/2004 | Barber et al. | | |
| 6,983,973 B2 * | 1/2006 | Suzuki | ......................... | 296/78.1 |
| 7,044,530 B1 * | 5/2006 | Hahne | ......................... | 296/78.1 |

FOREIGN PATENT DOCUMENTS

| | | |
|---|---|---|
| JP | 08-268365 | 10/1996 |
| JP | 2002-274465 | 9/2002 |

\* cited by examiner

*Primary Examiner* — Joseph Pape
*Assistant Examiner* — Dana Ivey
(74) *Attorney, Agent, or Firm* — Ditthavong Mori & Steiner, P.C.

(57) ABSTRACT

A windshield device for saddle-ride vehicles includes a front wheel, a front suspension, a steering handlebar, a windshield, a windshield stay, and a connecting structure. The front suspension includes left and right front forks and top and bottom bridges. The left and right front forks pivotally support the front wheel. The top and bottom bridges connect the left front fork to the right front fork and are steerably supported by a head pipe in a front portion of a vehicle body. The steering handlebar is connected to the top bridge. The windshield is detachably provided forward of the steering handlebar. The windshield stay is attached to the windshield. The connecting structure connects the windshield stay to an upper surface of the front suspension.

13 Claims, 10 Drawing Sheets

WINDSHIELD DEVICE FOR SADDLE-RIDE VEHICLES

CROSS-REFERENCE TO RELATED APPLICATIONS

The present application claims priority under 35 U. S. C. §119 to Japanese Patent Application No. 2011-076609, filed Mar. 30, 2011. The contents of this application are incorporated herein by reference in their entirety.

BACKGROUND OF THE INVENTION

1. Field of the Invention

The present invention relates to a windshield device for saddle-ride vehicles.

2. Discussion of the Background

Heretofore, as this type of a windshield device in which a windshield is detachable, a windshield assembly for motorcycles has been proposed (e.g., Japanese Patent Application Publication No. H08-268365) in which bushings are provided in side portions of a motorcycle and in which sockets that engage with the bushings are provided in brackets of a windshield.

Moreover, as a technique for enabling a windshield to be attached to and detached from a steering device, a structure for attaching a part to be placed in a front portion of a motorcycle has been proposed (e.g., Japanese Patent Application Publication No. 2002-274465). In the motorcycle, a front fork is steerably supported by a head pipe at a front end of a vehicle-body frame, and a steering handlebar is connected to an upper end portion of the front fork. The front fork includes a pair of fork legs each of which has a cylindrical lower case having a lower end portion thereof pivotally supporting a front wheel and a cylindrical upper case fitted to the lower case to be configured to be expandable and contractible and which are placed on opposite sides of the front wheel, a top bridge for connecting upper portions of the pair of upper cases, and a bottom bridge for connecting the two upper cases below the top bridge. In the foregoing structure, a part fixture for supporting a windscreen placed forward of the steering handlebar is detachably attached to the upper cases of the front fork using a clamp. Further, a detachable windshield has been proposed (e.g., U.S. Pat. No. 6,736,441) in which a windshield is detachably attached to a front fork using a clamp.

SUMMARY OF THE INVENTION

According to one aspect of the present invention, a windshield device for saddle-ride vehicles includes a front wheel, a front suspension, a steering handlebar, a windshield, a windshield stay, and a connecting structure. The front suspension includes left and right front forks, and top and bottom bridges. The left and right front forks pivotally support the front wheel. The top and bottom bridges connect the left front fork to the right front fork and are steerably supported by a head pipe in a front portion of a vehicle body. The steering handlebar is connected to the top bridge. The windshield is detachably provided forward of the steering handlebar. The windshield stay is attached to the windshield. The connecting structure connects the windshield stay to an upper surface of the front suspension.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
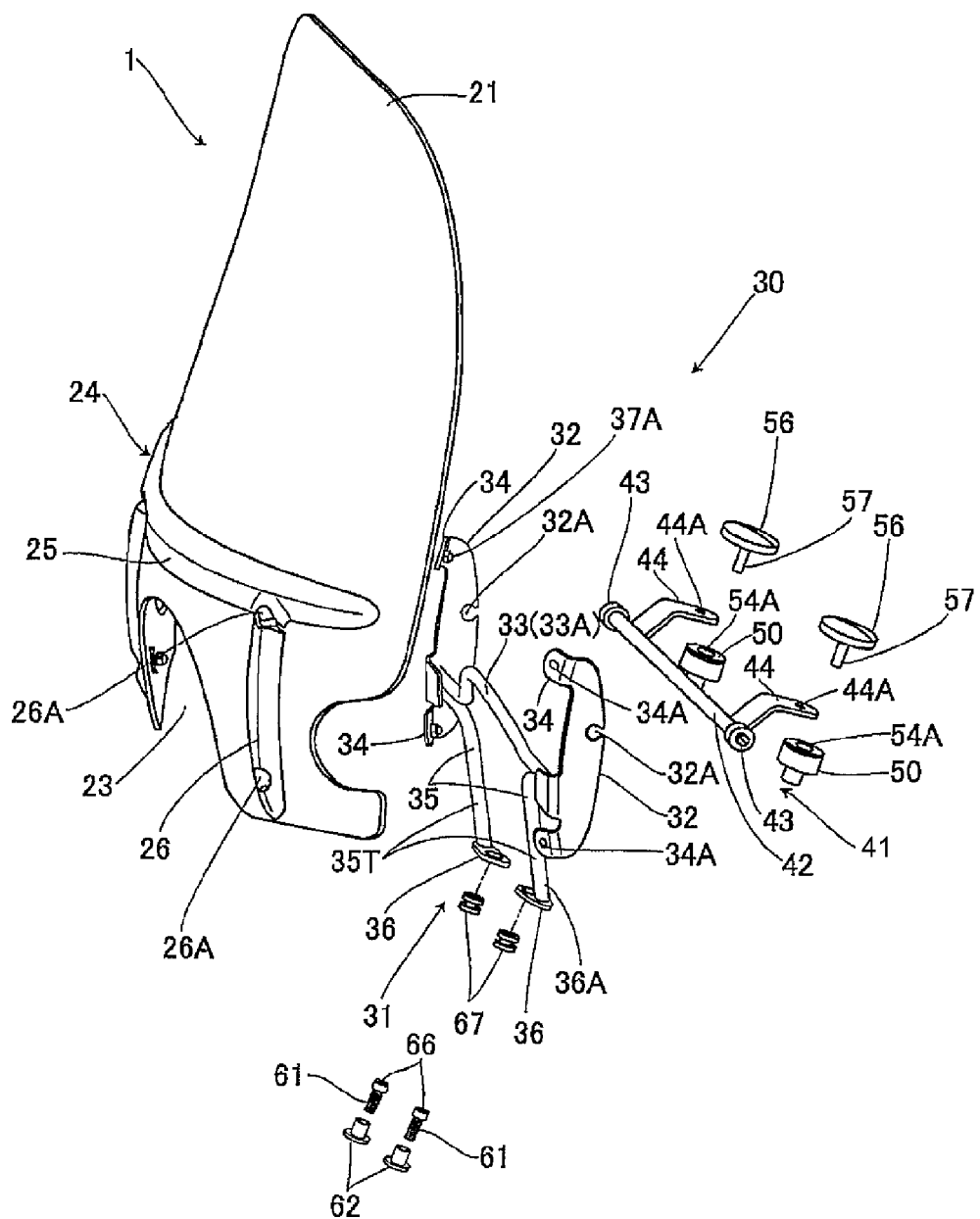
FIG. 1 is an exploded perspective view of a principal part of a windshield device, which shows embodiment 1 of the present invention.

The embodiments will now be described with reference to the accompanying drawings, wherein like reference numerals designate corresponding or identical elements throughout the various drawings.

Hereinafter, embodiment 1 of a windshield device for saddle-ride vehicles according to the present invention will be described with reference to the drawings.

Embodiment 1

As shown in FIGS. 1 to 8, a windshield device 1 for saddle-ride vehicles such as motorcycles is provided in a front portion of a saddle-ride vehicle (hereinafter referred to as a vehicle) 2. At a front end of a vehicle-body frame (not shown) of the vehicle 2, a head pipe 3 is provided. The head pipe 3 steerably supports a front suspension (front suspension device) 4. A lower end of the front suspension 4 pivotally supports a front wheel 5. An upper end of the front suspension 4 has a steering handlebar 6 connected thereto.

Figure 2:
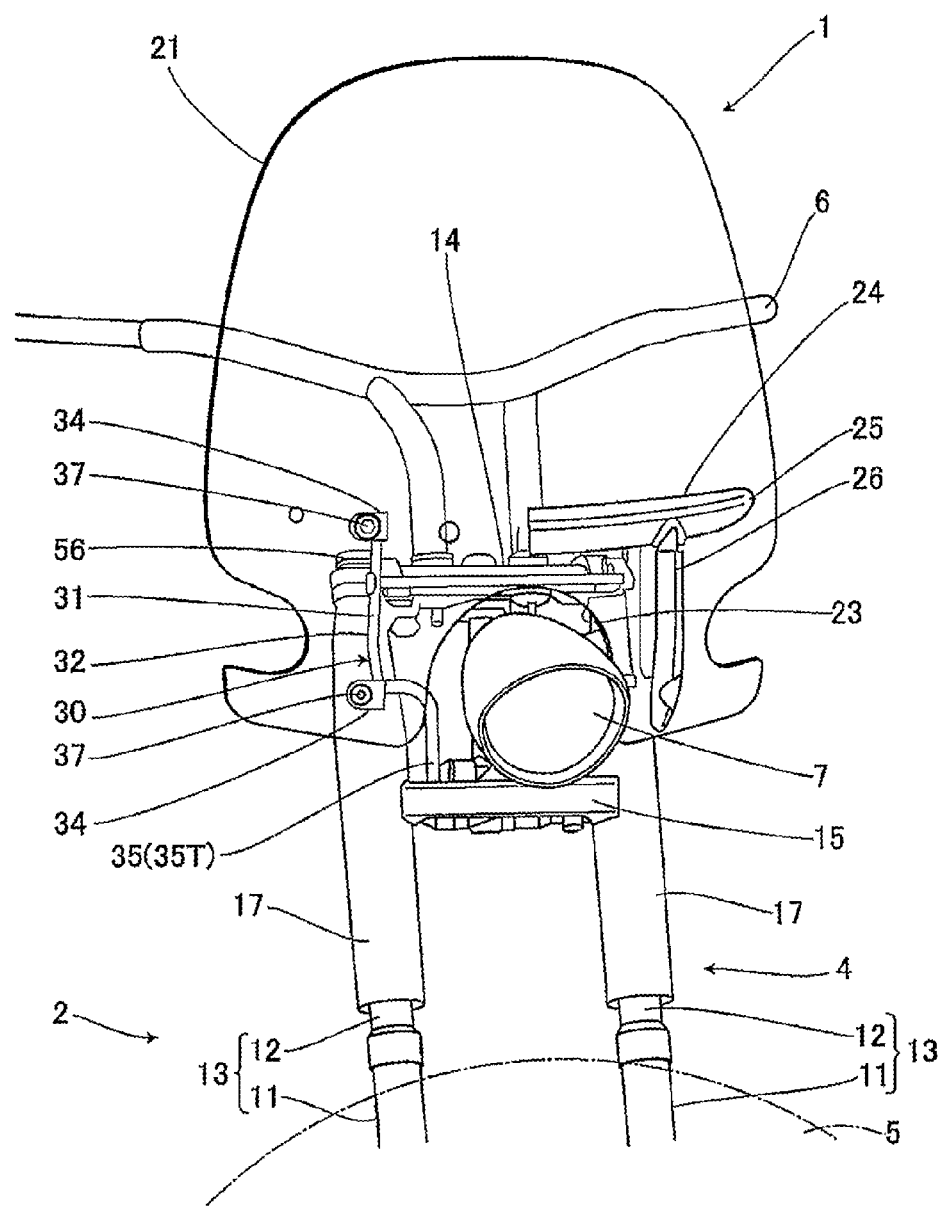
FIG. 2 is a perspective view of a principal part with a windshield attached, which shows the same embodiment.
Figure 3:
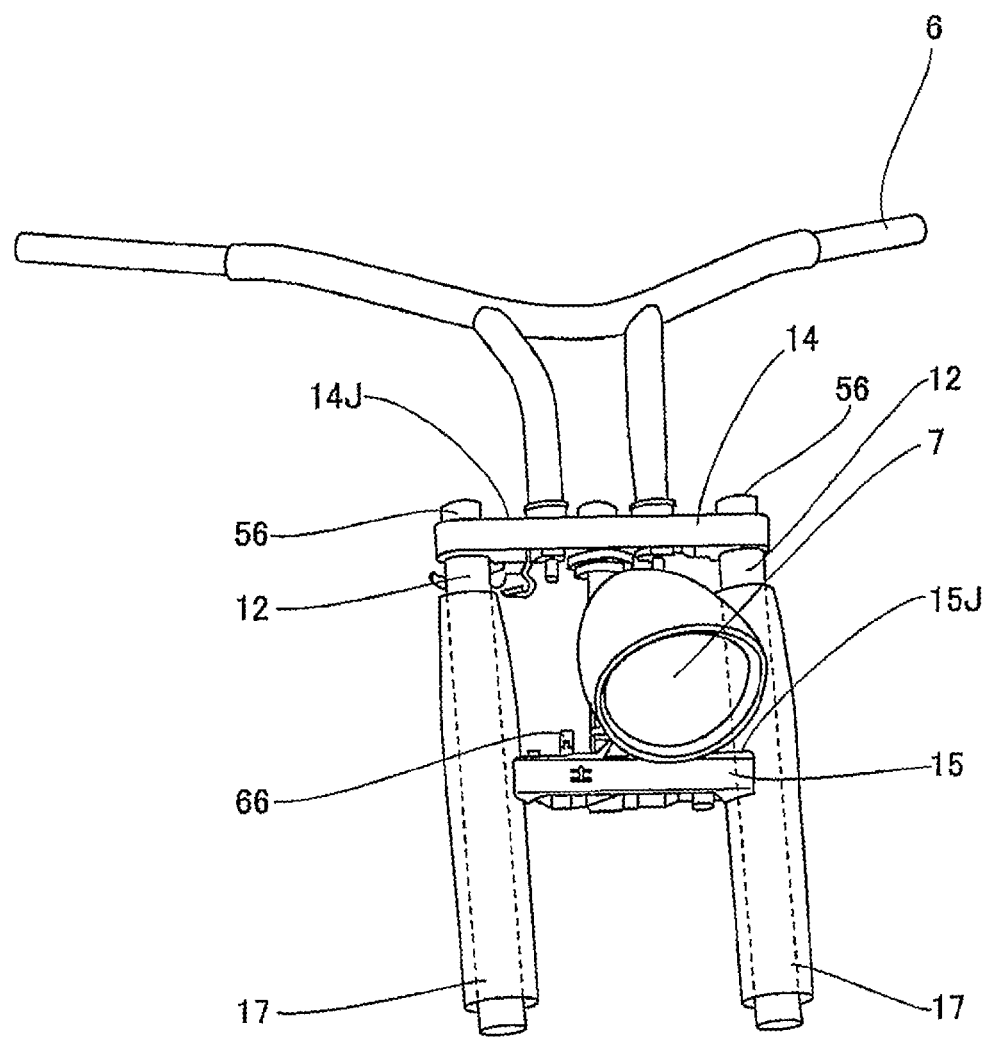
FIG. 3 is a perspective view of a principal part with the windshield detached, which shows the same embodiment.

As shown in FIG. 2, the front suspension 4 includes a pair of front forks 13, 13 each of which has a cylindrical bottom case 11 having a lower end portion thereof pivotally supporting the front wheel 5 and a cylindrical fork pipe 12 fitted to the bottom case 11 to be configured to be expandable and contractible and which are placed on opposite sides of the front wheel 5, a top bridge 14 for connecting upper portions of the pair of fork pipes 12, 12, and a bottom bridge 15 for connecting the two fork pipes 12, 12 below the top bridge 14. A steering shaft 16 provided between the top bridge 14 and the bottom bridge 15 is rotatably supported by the head pipe 3 of the vehicle-body frame. Moreover, in this example, a fork cover 17 externally covers the fork pipe 12. It should be noted that in FIG. 2 and the like, the fork cover 17 is omitted below a certain position.

Figure 4:
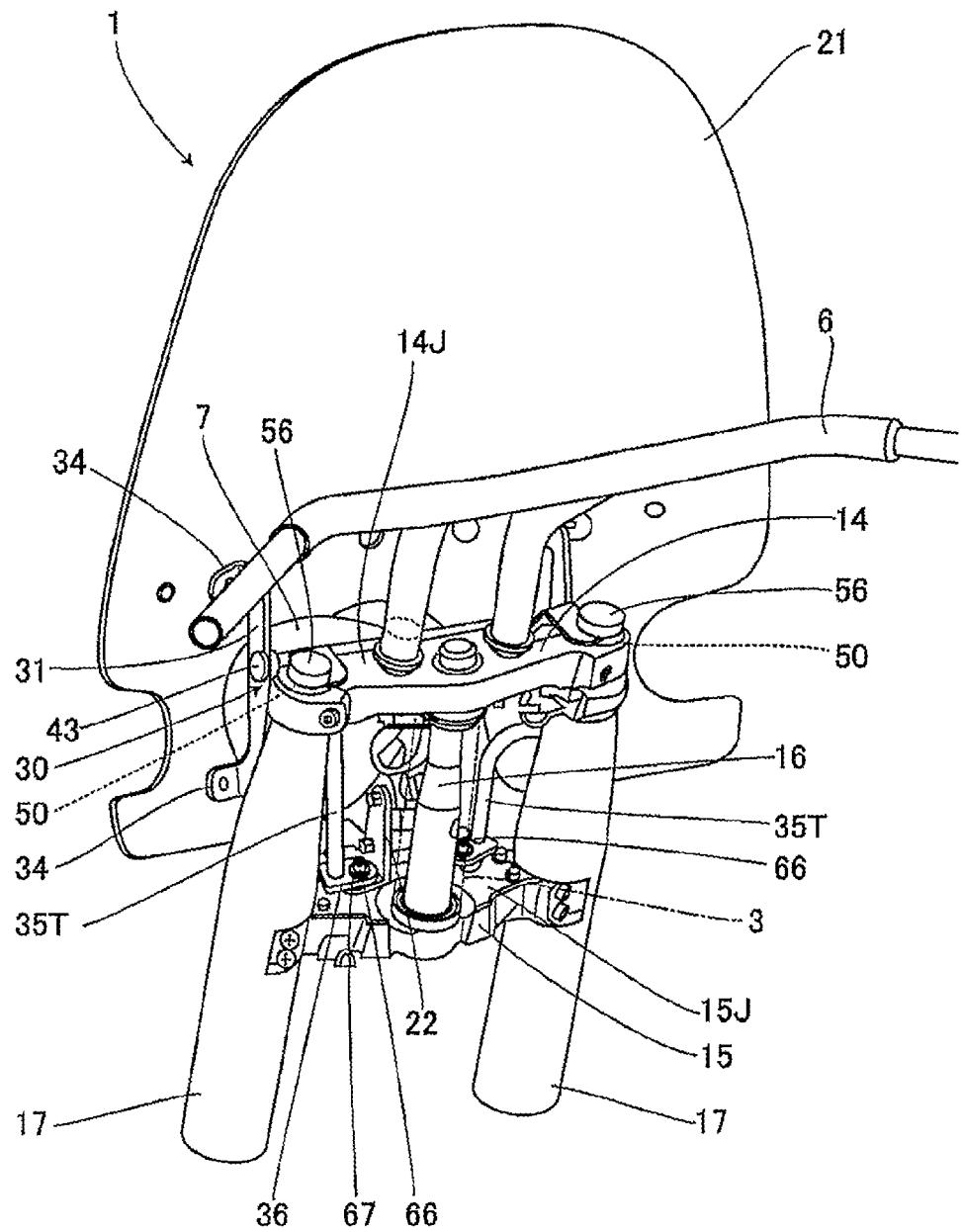
FIG. 4 is a perspective view of a principal part with the windshield attached, which shows the same embodiment.

As shown in FIGS. 2 and 4, a transparent windshield 21 is placed forward of the steering handlebar 6. At the center of a lower portion of the windshield 21, a cut-away opening portion 23 is provided through which a headlamp 7 supported by a lamp bracket 2 provided in the bottom bridge 15 on the front suspension 4 is exposed. A lower portion of the cut-away opening portion 23 is open. Moreover, on the front face side of the windshield 21, a garnish 24 is placed on both sides of and over the cut-away opening portion 23. The garnish 24 integrally includes a laterally extended portion 25 laterally extended over the cut-away opening portion 23 and vertically extended portions 26, 26 vertically extended from the laterally extended portion 25 on the left and right sides of the cut-away opening portion 23. In the vertically extended portion 26, through-holes 26A, 26A arranged one above the other are drilled. Moreover, on the back side of the windshield 21, a windshield stay 30 is placed such that the windshield 21 is interposed between the windshield stay 30 and the garnish 24. The garnish 24, the windshield 21, and the wind stay 30 are screwed together.

The windshield stay 30 has a front stay 31 on the front side and an upper stay 41 on the rear side. In the front stay 31, left and right attachment plates 32, 32 are connected by a lateral rod 33, and a convex curved portion 33A is formed at the center of the lateral rod 33 to correspond to an upper portion of the headlamp 7. Moreover, inwardly folded portions 34, 34 arranged one above the other are provided in a front portion of the attachment plate 32. In the inwardly folded portions 34, 34, through-holes 34A, 34A are drilled. Furthermore, a bolt 37 is inserted through a through-hole 26A of the garnish 24, a through-hole 21A of the windshield 21, and a through-hole 34A of the front stay 31, and a nut 37A is screwed onto the bolt 37. Thus, the garnish 24, the windshield 21, and the front stay 31 are screwed together.

Moreover, connecting rods 35, 35 to be fixed to the bottom bridge 15 are provided in the left and right portions of the front stay 31. Each of the connecting rods 35, 35 is in an L shape. A tip of the connecting rod 35 is fixed to the attachment plate 32. A vertical rod portion 35T of the connecting rod 35 is extended below the attachment plate 32. At a lower end of the vertical rod portion 35T, a plate-shaped fixing portion 36 to be detachably fixed to the bottom bridge 15 is provided. In the fixing portion 36, a through-hole 36A is drilled.

The front stay 31 has the upper stay 41 connected thereto. The upper stay 41 includes a lateral rod 42 made of a cylindrical rod or the like, and connecting portions 43, 43 provided at left and right ends of the lateral rod 42 and connected to the front stay 31. On the left and right sides of the lateral rod 42, a plate-shaped fixing portion 44 detachably fixed to the top bridge 14 is provided. The fixing portion 44 is formed approximately in an inverted V shape. In a rear portion of the fixing portion 44, a through-hole 44A is drilled.

Figure 5:
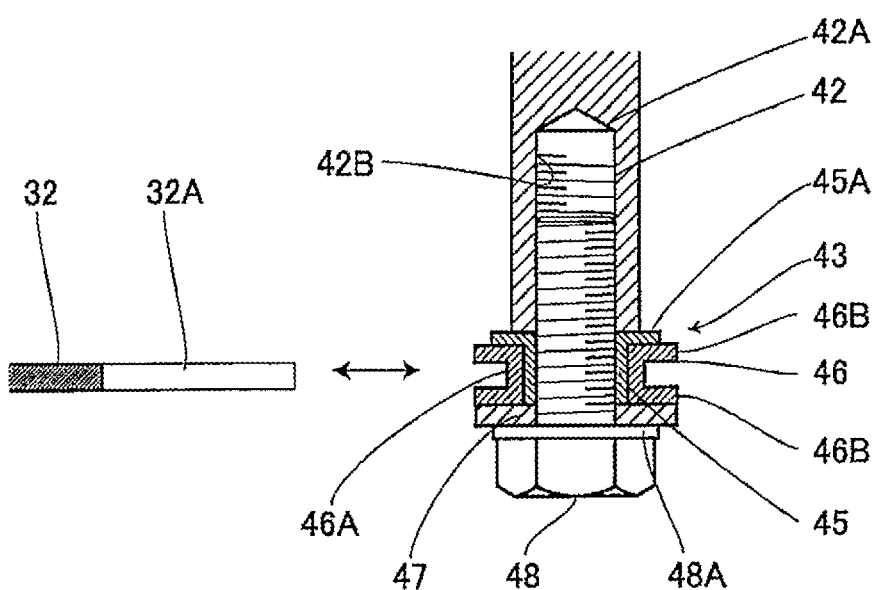
FIG. 5 is a cross-sectional view of a connecting portion between a front stay and an upper stay, which shows the same embodiment.

Moreover, a cut-away hole 32A to which the connecting portion 43 is connected is formed in an upper portion of the attachment plate 32. A rear portion of the cut-away hole 32A is open. Further, as shown in FIG. 5, the connecting portion 43 is configured by forming a prepared hole 42A in an end face of the lateral rod 42, forming a female thread portion 42B in the prepared hole 42A, placing at the end face of the lateral rod 42 a cylindrical portion 45 having a collar portion 45A and placing an elastic grommet 46 having the cylindrical portion 45 inserted therein, and screwing a bolt 48 loosely inserted in a washer 47 and the cylindrical portion 45 into the female thread portion 42B inside the lateral rod 42. Furthermore, by press fitting a cylindrical portion 46A of the grommet 46 into the cut-away hole 32A from a rear portion of the cut-away hole 32A, the upper stay 41 can be connected to the front stay 31. On the other hand, when a force from the back is applied to the windshield 21, and the magnitude of the force reaches a predetermined value or more, the grommet 46 is removed from the cut-away hole 32A, and the windshield 21 is detached from the vehicle 2. It should be noted that the bolt 48 has a collar portion 48A which comes in contact with the washer 47. Moreover, the grommet 46 has collar portions 46B, 46B provided at two ends of the cylindrical portion 46A, and a portion of the attachment plate 32 around the cut-away hole 32A is sandwiched between the collar portions 46B, 46B.

Figure 6:
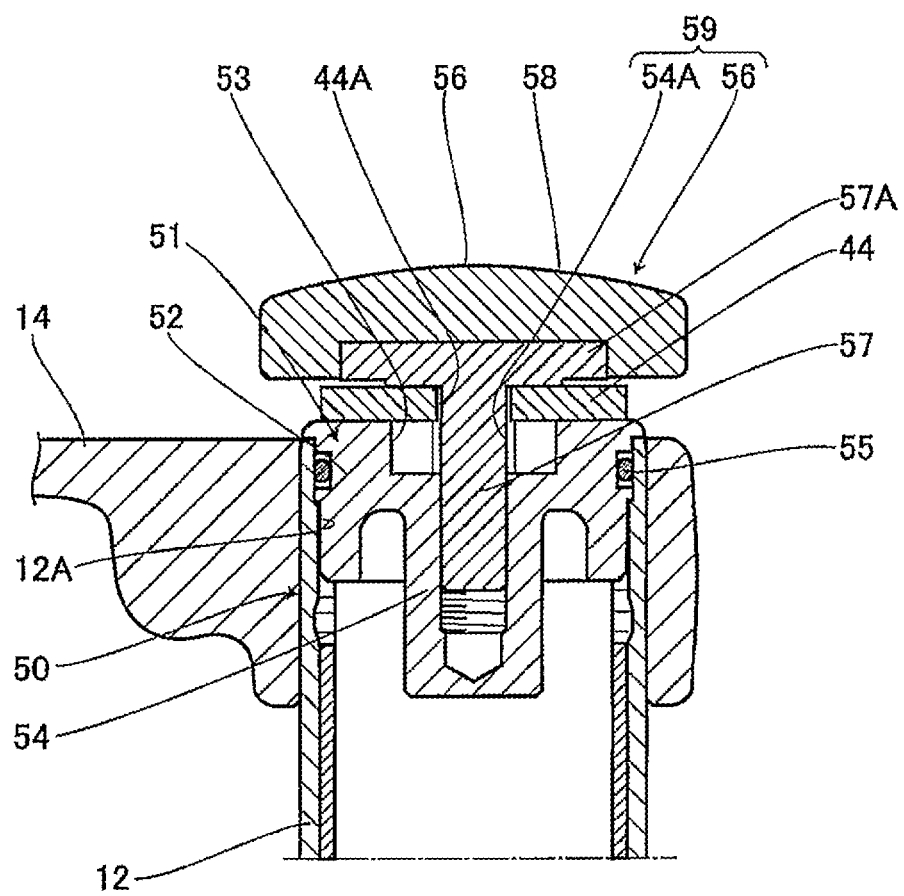
FIG. 6 is a cross-sectional view of a portion around means for the fixation between the front stay and a top bridge, which shows the same embodiment.

As shown in FIG. 4, connection receiving portions 50, 50 to which the upper stay 41 is connected are provided on the left and right sides of the top bridge 14. As shown in FIG. 6, the connection receiving portions 50, 50 are provided at upper ends of the front forks 13 of the front suspension 4 to correspond to through-holes 44A, 44A of the fixing portions 44, 44. Specifically, the connection receiving portion 50 includes a top bolt 51 to be screwed and fixed to an upper end of the fork pipe 12. The top bolt 51 includes an externally threaded body 52 to be screwed into a female thread portion 12A of the fork pipe 12, a hexagon socket 53, which is a tool engaging portion provided at the center of an upper surface of the externally threaded body 52, and an internally threaded cylindrical portion 54 provided under the hexagon socket 53. The top bolt 51 is fixed by screwing the externally threaded body 52 into the female thread portion 12A of the fork pipe 12. Further, an O-ring 55, which is a member for maintaining the airtightness between the externally threaded body 52 and an inner surface of the fork pipe 12, is provided around an outer circumference of an upper portion of the externally threaded body 52.

The connection receiving portion 50 has the upper stay 41 connected thereto with a fastener 56. The fastener 56 includes an external thread portion 57 made of aluminum and having a collar portion 57A, and a knob portion 58 made of a synthetic resin and provided integrally with the collar portion 57A to cover an outer surface of the collar portion 57A. The knob portion 58 is formed to have a larger outside diameter than the fork pipe 12. Accordingly, the knob portion 58 made of the synthetic resin appears without the collar portion 57A made of metal being exposed. Thus, excellent appearance design is provided. Furthermore, by inserting the external thread portion 57 through the through-hole 44A and screwing and fixing the external thread portion 57 to a female thread portion 54A of the internally threaded cylindrical portion 54 using the knob portion 58, the fixing portion 44 of the upper stay 41 is fastened and fixed to an upper surface 14J of the top bridge 14. On the other hand, the upper stay 41 can be unfixed by removing the fastener 56. As described above, the female thread portion 54A of the top bridge 14 and the fastener 56 constitute fixing means 59 for fixing an upper portion of the windshield stay 30 to the upper surface 14J of the top bridge 14.

Figure 7:
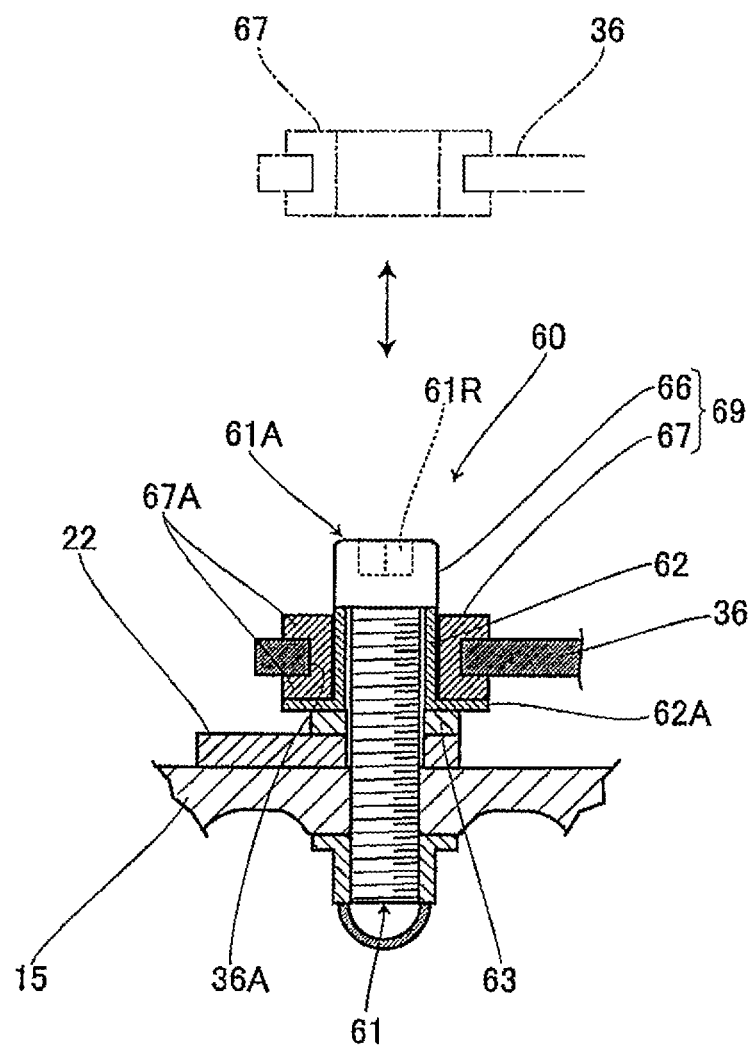
FIG. 7 is a cross-sectional view of a portion around means for the positioning between the front stay and a bottom bridge, which shows the same embodiment.
Figure 8:
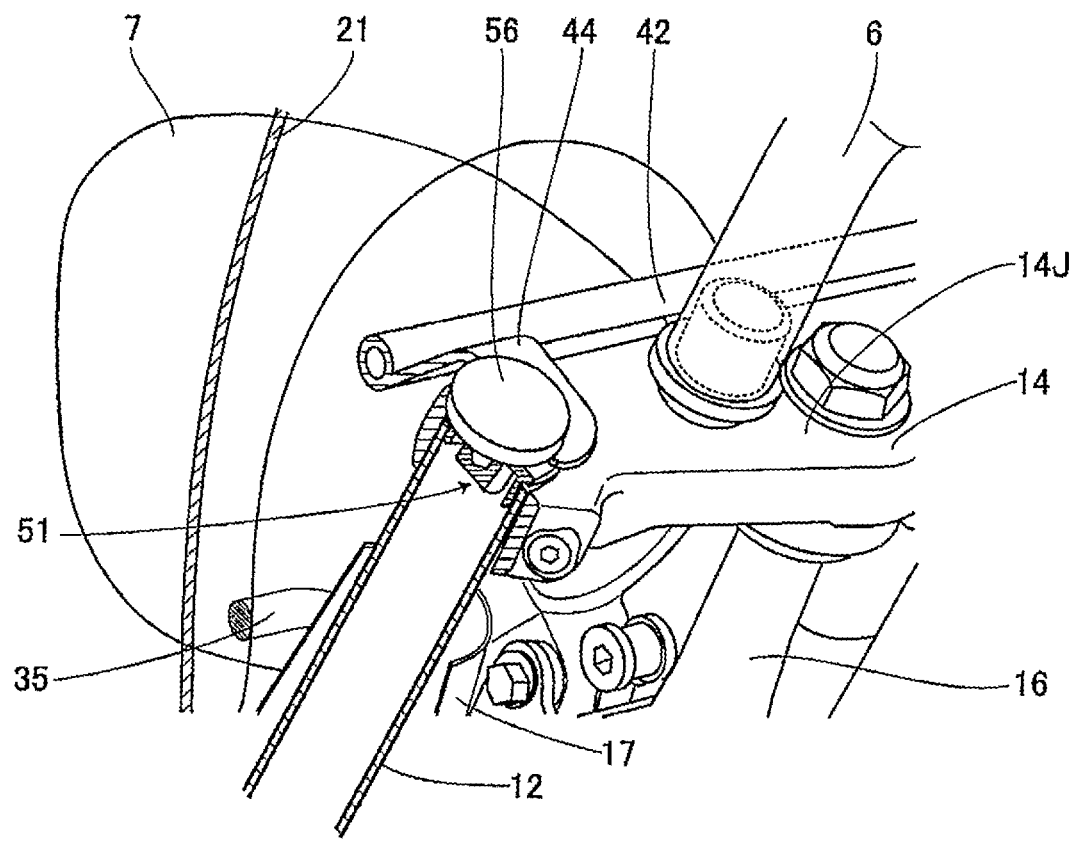
FIG. 8 is a perspective view with a portion around the means for the fixation between the front stay and the top bridge partially shown in a cross-sectional manner, which shows the same embodiment.

On the left and right sides of the bottom bridge 15, connecting boss portions 60, 60 to which the front stay 31 is connected are provided. As shown in FIG. 7, the connecting boss portions 60, 60 are provided on an upper surface 15J of the bottom bridge 15 in a protruding manner to correspond to the through-holes 36A, 36A of the fixing portions 36, 36. Specifically, the connecting boss portion 60 includes a bolt 61 to be screwed and fixed to the upper surface 15J of the bottom bridge 15, a tube 62 through which the bolt 61 is inserted, a collar portion 62A provided integrally with a lower end of the tube 62, and a washer 63. A head portion 61A of the bolt 61 is in a cylindrical shape. An upper surface of the head portion 61A has a hexagon socket 61R, which is a tool engaging portion. The outside diameters of the head portion 61A and the tube 62 are approximately the same. The headlamp 7 has a lamp bracket 22 fixed thereto. In the lamp bracket 22, a fixing portion 65 to be fixed to the bottom bridge 15 is provided. In the fixing portion 65, a through-hole 65A through which the bolt 61 is inserted is provided.

Furthermore, the bolt 61 is inserted through the tube 62, the washer 63, and the through-hole 65A. The bolt 61 is screwed and fixed to a female thread portion 15A of the bottom bridge 15, and, at the same time, the lamp bracket 22 is fixed to the bottom bridge 15. Thus, the head portion 61A and the tube 62 constitute a connecting portion 66 to which the fixing portion 36 of the front stay 31 is connected.

On the other hand, in the fixing portion 36 of the front stay 31, a cylindrical portion 67A of an elastic grommet 67, which is a connection receiving portion, is inserted in the through-hole 36A. The fixing portion 36 is sandwiched between collar portions 67B, 67B located at two ends of the cylindrical portion 67A. Furthermore, by inserting the connecting portion 66 into the cylindrical portion 67A of the grommet 67, the position of the fixing portion 36 of the front stay 31 is fixed with respect to the bottom bridge 15. As described above, the connecting portion 66 provided on the upper surface 15J of the bottom bridge 15 in a protruding manner and the grommet 67 constitute fall prevention means 69.

As described above, the connecting portion 66 is inserted into the grommet 67 on the lower portion side of the front stay 31 of the windshield stay 30 to be positioned and fixed with respect to the vehicle, and the upper portion side of the windshield stay 30 is fixed with respect to the vehicle by the fastening of the fastener 56. Accordingly, the attachment of the windshield 21 can be performed in a simple manner without using a tool.

As described above, in this embodiment, corresponding to claim 1, the windshield device for saddle-ride vehicles including the front wheel 5, the front suspension 4 having the pair of left and right front forks 13, 13 for pivotally supporting the front wheel 5, and the top bridge 14 and the bottom bridge 15 connecting the left and right front forks 13, 13 and being steerably supported by the head pipe 3 in a front portion of the vehicle body, the steering handlebar 6 connected to the top bridge 14, the windshield 21 detachably provided forward of the steering handlebar 6, and the windshield stay 30 attached to the windshield 21, further includes the fixing means 59 for fixing the windshield stay 30 to the upper surface 14J of the top bridge 14, which is an upper surface of the front suspension 4. Accordingly, the windshield 21 can be attached and detached by fixing the windshield stay 30 to the upper surface of the front suspension 4. Furthermore, since the upper surface of the front suspension 4 is a place visible from a driver, the operation of attaching or detaching the windshield stay 30 can be easily performed. Moreover, it is also possible to simultaneously mount the windshield 21 and a front fork cover.

Moreover, as described above, in this embodiment, corresponding to claim 2, the windshield device 1 includes the fall prevention means 69 for positioning the windshield stay 30 with respect to the bottom bridge 15. Accordingly, the windshield 21 can be attached and detached by positioning the windshield stay 30 with respect to the bottom bridge 15 and fixing the windshield stay 30 to the upper surface of the front suspension 4, and only a fall prevention member on the bottom bridge 15 in a lower portion is left on the vehicle side when the windshield 21 is detached. Thus, appearance design can be secured. Moreover, even when the windshield 21 receives a wind load from the front, the fall prevention means 69 prevents the windshield 21 from falling down.

Moreover, as described above, in this embodiment, corresponding to claim 3, the fixing means 59 includes the female thread portion 54A at an upper end of the front fork 13, and the fastener 56 which is screwed into the female thread portion 54A to fix the windshield stay 30 to the upper end of the front fork 13. Accordingly, by driving the fastener 56, the fixing and unfixing of the windshield stay 30 can be performed in a simple manner.

Moreover, as described above, in this embodiment, corresponding to claim 4, the fall prevention means 69 includes the connecting portion 66 provided on the bottom bridge 15 in a protruding manner and the grommet 67. The grommet 67 is a connection receiving portion which is provided in the windshield stay 30 and into which the connecting portion 66 is inserted. Accordingly, only by inserting the connecting portion 66 into the grommet 67, the windshield stay 30 can be easily positioned with respect to the bottom bridge 15.

Moreover, effects specific to the embodiment will be described. Since the fastener 56 has the knob portion 58 made of a synthetic resin and provided integrally with the collar portion 57A to cover an outer surface of the collar portion 57A, excellent appearance design is provided irrespective of whether the windshield 21 is attached or detached. Moreover, the bolt 61 included in the connecting portion 66 is also used to fix the lamp bracket 22, and is therefore highly convenient. Further, by inserting the connecting portion 66 of the bottom bridge 15 into the grommet 67 provided in a lower portion of the front stay 31, the positioning between the bottom bridge 15 and the windshield stay 30 can be performed in a simple manner. Moreover, the windshield stay 30 is configured by combining the front stay 31 in the vertical direction and the upper stay 41 in the longitudinal direction. Accordingly, the windshield stay 30 can be placed in a relatively narrow space between the steering handlebar 6 and the windshield 21. Moreover, the grommet 67, which is the connection receiving portion, has elasticity, and therefore can absorb vibrations and the like in the state of being connected to the connecting portion. Further, the upper end of the fork pipe 12 of the front suspension 4 is utilized as part of the fixing means 59. Specifically, by screwing the top bolt 51 into the upper end of the fork pipe 12, a structure for fixing the windshield stay 30 can be obtained.

Embodiment 2

Figure 9:
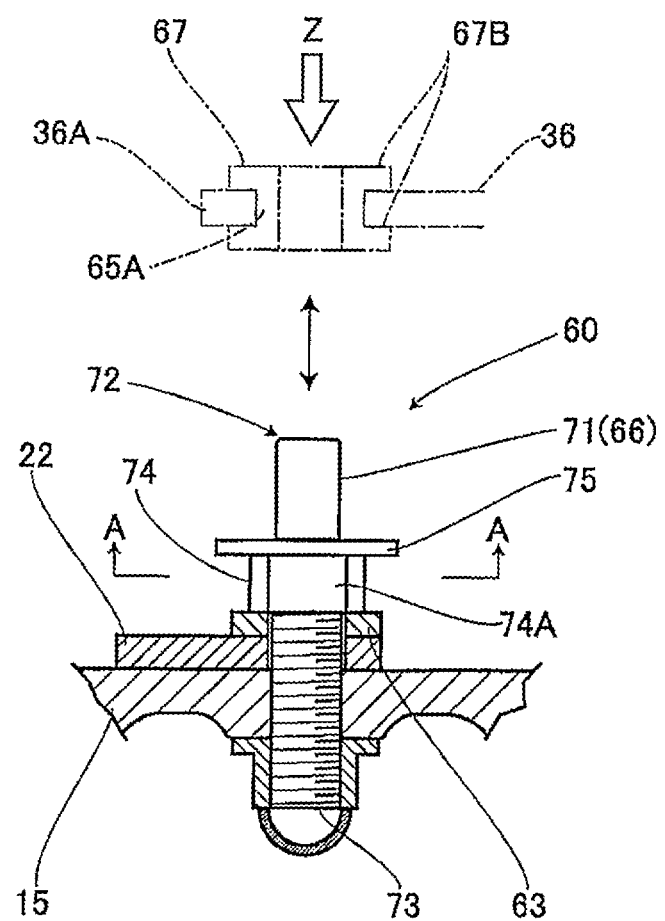
FIG. 9 is a cross-sectional view of a portion around means for the positioning between the front stay and the bottom bridge, which shows embodiment 2 of the present invention.
Figure 10:
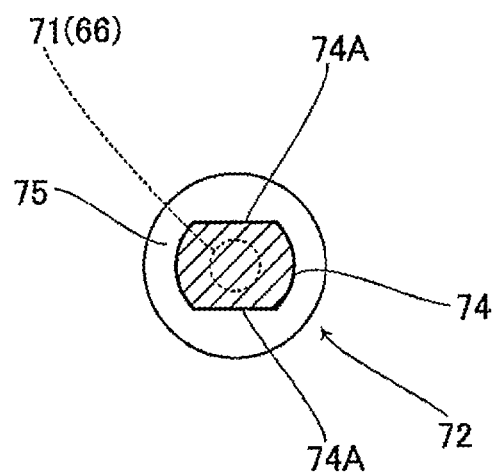
FIG. 10 is a cross-sectional view taken along line A-A of FIG. 9, which shows the same embodiment.

Hereinafter, embodiment 2 of the present invention will be described with reference to the accompanying drawings. It should be noted that the same portions as those of the above-described embodiment 1 are denoted by the same reference numerals, and explanations thereof will be omitted. FIGS. 9 to 10 show a modified example of the fall prevention means 69. The bolt 61 and the tube 62 are not used, but a bolt 72 is used which includes a boss portion 71 constituting the connecting portion 66. The bolt 72 has in a lower portion thereof an external thread portion 73 to be screwed into the female thread portion 15A. A head portion 74 with which a tool engages is provided on the external thread portion 73. As shown in FIG. 10, the head portion 74 has plane portions 74A, 74A formed by cutting away two opposite portions of the side surface of a circular cylinder. A collar portion 75 having a larger outer shape than the head portion 74 is provided on the head portion 74. The boss portion 71 in the shape of a circular cylinder is provided on the head portion 74 in a protruding manner.

Furthermore, by inserting the boss portion 71 into the grommet 67, a lower portion of the windshield stay 30 can be positioned with respect to the upper surface of the bottom bridge 15.

As described above, this embodiment also has operation and effects similar to those of the above-described embodiment 1.

Moreover, in this example, the connecting portion 66 can be provided in the bottom bridge 15 with the one bolt 72.

It should be noted that the present invention is not limited to this embodiment, and various modifications can be made without departing from the spirit of the present invention. For example, the shape of the windshield can be appropriately selected. Moreover, in the embodiments, windshield stays which are positioned using the fall prevention means have been shown as examples. However, for example, in the case of a compact windshield, the windshield stay may be detachably attached to the upper ends of the front forks by using only the fixing means without using the fall prevention means. In this case, the upper stay may be attached directly to the windshield, and the upper stay may be fixed to the upper ends of the front forks.

According to the embodiment of the present invention, a windshield device for a saddle-ride vehicle includes a front wheel, a front suspension having a pair of left and right front forks for pivotally supporting the front wheel, and top and bottom bridges connecting the left and right front forks and being steerably supported by a head pipe in a front portion of a vehicle body, a steering handlebar connected to the top bridge, a windshield detachably provided forward of the steering handlebar, and a windshield stay attached to the windshield. The windshield device for saddle-ride vehicles further includes fixing means for fixing the windshield stay to an upper surface of the front suspension.

Moreover, according to the embodiment of the present invention, the windshield device further includes fall prevention means for positioning the windshield stay with respect to the bottom bridge.

Moreover, according to the embodiment of the present invention, the fixing means includes female thread portions provided at upper ends of the front forks, and fasteners which are screwed into the female thread portions to fix the windshield stay to the upper ends of the front forks.

Moreover, according to the embodiment of the present invention, the fall prevention means includes a connecting portion provided on the bottom bridge in a protruding manner, and a connection receiving portion which is provided in the windshield stay and into which the connecting portion is inserted.

In the windshield device according to the embodiment of the present invention, the windshield can be attached and detached by fixing the windshield stay to the upper surface of the front suspension. Since the upper surface of the front suspension is a place visible from a driver, the operation of attaching or detaching the windshield stay can be easily performed. Moreover, it is also possible to simultaneously mount the windshield and a fork cover.

Moreover, in the windshield device according to the embodiment of the present invention, the windshield can be attached and detached by positioning the windshield stay with respect to the bottom bridge and fixing the windshield stay to the upper surface of the front suspension, and only a fall prevention member on the bottom bridge in a lower portion is left on the vehicle side when the windshield is detached. Thus, appearance design can be secured. Moreover, even when the windshield receives a wind load from the front, the fall prevention means prevents the windshield from falling down.

Moreover, in the windshield device according to the embodiment of the present invention, by driving the fastener, the fixing and unfixing of the windshield stay can be performed in a simple manner.

Moreover, in the windshield device according to the embodiment of the present invention, only by inserting the connecting portion into the connection receiving portion, the windshield stay can be easily positioned with respect to the bottom bridge.

Obviously, numerous modifications and variations of the present invention are possible in light of the above teachings. It is therefore to be understood that within the scope of the appended claims, the invention may be practiced otherwise than as specifically described herein.

What is claimed is:

1. A windshield device for saddle-ride vehicles, comprising:
    a front wheel;
    a front suspension comprising:
        a left front fork and a right front fork pivotally supporting the front wheel; and
        a top bridge and a bottom bridge connecting the left front fork to the right front fork and supported by a head pipe in a front portion of a vehicle body in a longitudinal direction of the vehicle body;
    a steering handlebar connected to the top bridge;
    a windshield detachably provided forward of the steering handlebar in the longitudinal direction of the vehicle body;
    a windshield stay attached to the windshield; and
    a connecting structure directly connecting the windshield stay to an upper surface of the front suspension, wherein the upper surface of the front suspension to which the windshield stay is directly connected includes upper surfaces of the left front fork and the right front fork and an upper surface of the top bridge.

2. The windshield device for saddle-ride vehicles according to claim 1, further comprising:
    a fall prevention structure to position the windshield stay with respect to the bottom bridge.

3. The windshield device for saddle-ride vehicles according to claim 2, wherein
    the connecting structure comprises female thread portions provided at upper ends of the left front fork and the right front fork, and fasteners screwed into the female thread portions to connect the windshield stay to the upper ends of the left front fork and the right front fork.

4. The windshield device for saddle-ride vehicles according to claim 2, wherein
    the fall prevention structure comprises a connecting portion provided on the bottom bridge in a protruding manner, and a connection receiving portion provided in the windshield stay, the connecting portion being inserted into the connection receiving portion.

5. The windshield device for saddle-ride vehicles according to claim 1, wherein
    the connecting structure comprises female thread portions provided at upper ends of the left front fork and the right front fork, and fasteners screwed into the female thread portions to connect the windshield stay to the upper ends of the left front fork and the right front fork.

6. The windshield device for saddle-ride vehicles according to claim 1, wherein the connecting structure connects the windshield stay to upper ends of the left a front fork and the right front fork.

7. The windshield device for saddle-ride vehicles according to claim 1, wherein
the windshield stay includes a first stay and a second stay, the first stay being connected to the windshield, the second stay connecting the first stay to the upper surface of the front suspension.

8. The windshield device for saddle-ride vehicles according to claim 7, wherein
the first stay is detachably connected to the second stay.

9. The windshield device for saddle-ride vehicles according to claim 7, further comprising:
a fall prevention structure to position the first stay of the windshield stay with respect to the bottom bridge.

10. A windshield device for saddle-ride vehicles, comprising:
a front wheel;
a front suspension comprising:
a left front fork and a right front fork pivotally supporting the front wheel; and
a top bridge and a bottom bridge connecting the left front fork to the right front fork and supported by a head pipe in a front portion of a vehicle body in a longitudinal direction of the vehicle body;
a steering handlebar connected to the top bridge;
a windshield stay including an upper stay provided on the front suspension;
a connecting boss portion provided directly on an upper surface of the bottom bridge; and
a windshield detachably provided forward of the steering handlebar in the longitudinal direction of the vehicle body and supported by the upper stay and the connecting boss portion,
wherein the windshield stay includes a first stay and the upper stay, the first stay being connected to the windshield, the upper stay connecting the first stay to the upper surface of the front suspension.

11. The windshield device for saddle-ride vehicles according to claim 10, further comprising:
a connecting structure connecting the windshield stay to an upper surface of the front suspension, wherein the upper surface of the front suspension to which the windshield stay is connected includes upper surfaces of the left front fork and the right front fork and an upper surface of the top bridge,
wherein the connecting structure comprises female thread portions provided at upper ends of the left front fork and the right front fork, and fasteners screwed into the female thread portions to connect the windshield stay to the upper ends of the left front fork and the right front fork.

12. The windshield device for saddle-ride vehicles according to claim 11, wherein
the connecting structure connects the windshield stay to upper ends of the left front fork and the right front fork.

13. A windshield device for saddle-ride vehicles, comprising:
a front wheel;
a front suspension comprising:
a left front fork and a right front fork pivotally supporting the front wheel; and
a top bridge and a bottom bridge connecting the left front fork to the right front fork and supported by a head pipe in a front portion of a vehicle body in a longitudinal direction of the vehicle body;
a steering handlebar connected to the top bridge;
a windshield stay including an upper stay provided on the front suspension;
a connecting boss portion provided directly on an upper surface of the bottom bridge;
a windshield detachably provided forward of the steering handlebar in the longitudinal direction of the vehicle body and supported by the upper stay and the connecting boss portion; and
a fall prevention structure to position the windshield stay with respect to the bottom bridge,
wherein the fall prevention structure comprises a connecting portion provided on the bottom bridge in a protruding manner, and a connection receiving portion provided in the windshield stay, the connecting portion being inserted into the connection receiving portion.

* * * * *